(12) United States Patent
Miyake

(10) Patent No.: US 11,900,000 B2
(45) Date of Patent: Feb. 13, 2024

(54) IMAGE FORMING DEVICE AND NON-TRANSITORY COMPUTER-READABLE RECORDING MEDIUM STORING COMPUTER-READABLE INSTRUCTIONS FOR IMAGE FORMING DEVICE

(71) Applicant: BROTHER KOGYO KABUSHIKI KAISHA, Nagoya (JP)

(72) Inventor: Takeshi Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/064,468

(22) Filed: Dec. 12, 2022

(65) Prior Publication Data

US 2023/0195395 A1 Jun. 22, 2023

(30) Foreign Application Priority Data

Dec. 22, 2021 (JP) .................. 2021-208599

(51) Int. Cl.
*G06F 3/12* (2006.01)

(52) U.S. Cl.
CPC ............ *G06F 3/1259* (2013.01); *G06F 3/121* (2013.01); *G06F 3/1207* (2013.01); *G06F 3/1234* (2013.01); *G06F 3/1204* (2013.01); *G06F 3/1288* (2013.01)

(58) Field of Classification Search
CPC ...... G06F 3/1259; G06F 3/1207; G06F 3/121; G06F 3/1234; G06F 3/1288
USPC ....................................... 358/1.14
See application file for complete search history.

(56) References Cited

U.S. PATENT DOCUMENTS

| 6,181,436 | B1* | 1/2001 | Kurachi | ................ G06F 3/1285 |
| | | | | 358/1.6 |
| 6,490,052 | B1 | 12/2002 | Yanagidaira | |
| 2003/0172308 | A1 | 9/2003 | Imai | |
| 2011/0019234 | A1* | 1/2011 | Nakamura | ............ G06F 3/1291 |
| | | | | 358/1.15 |
| 2017/0061262 | A1 | 3/2017 | Isobe | |
| 2020/0379695 | A1 | 12/2020 | Inoue | |

FOREIGN PATENT DOCUMENTS

| JP | 2000010747 A | 1/2000 |
| JP | 2003131833 A | 5/2003 |
| JP | 2003323360 A | 11/2003 |
| JP | 2017042955 A | 3/2017 |
| JP | 2020192730 A | 12/2020 |

* cited by examiner

*Primary Examiner* — Darryl V Dottin
(74) *Attorney, Agent, or Firm* — Scully, Scott, Murphy & Presser, PC

(57) ABSTRACT

An image forming device may be configured to repeatedly send an inquiry request to a server at a first interval and, in a case where a job execution response is received from the server, control the image forming engine to start image forming. The image forming device may be configured to in the case where the job execution response is received from the server, repeatedly send the inquiry request to the server at a second interval which is shorter than the first interval. In a case where the server receives a job stop instruction from the terminal device, the server sends a job stop response to the image forming device in response to the inquiring request received from the image forming device. In a case where the job stop response is received, the image forming is stopped.

11 Claims, 5 Drawing Sheets

FIG. 4
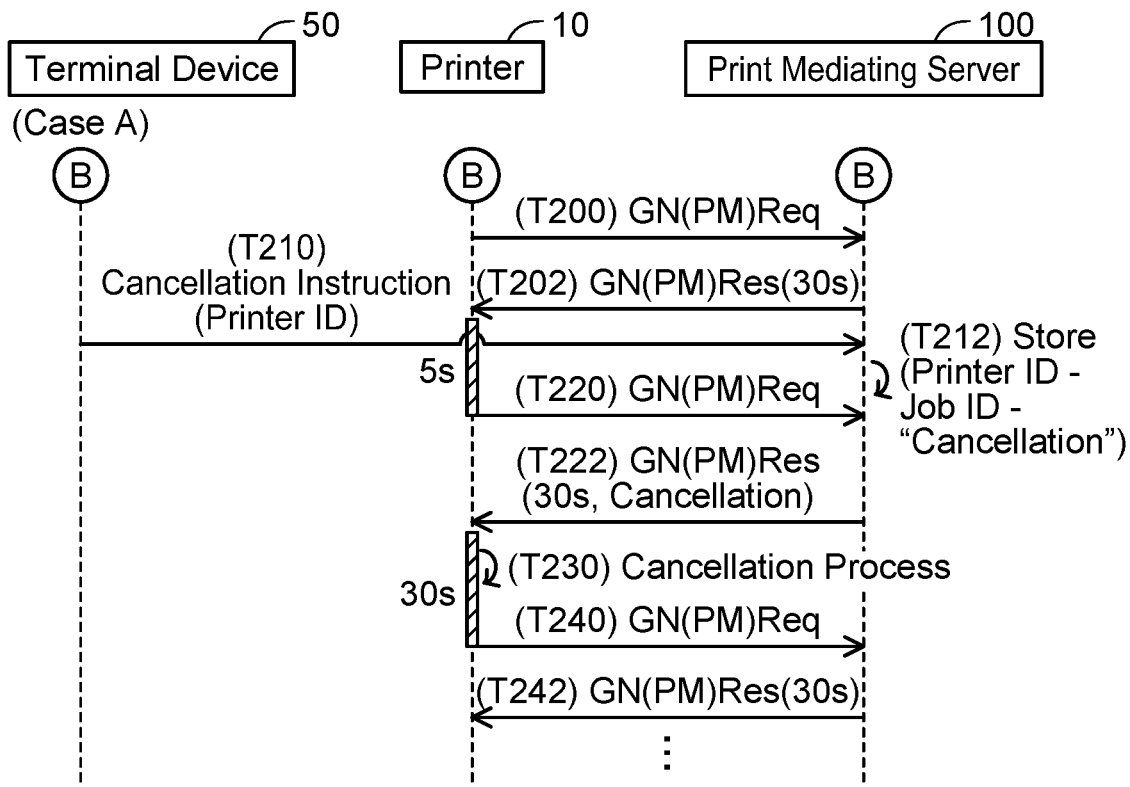
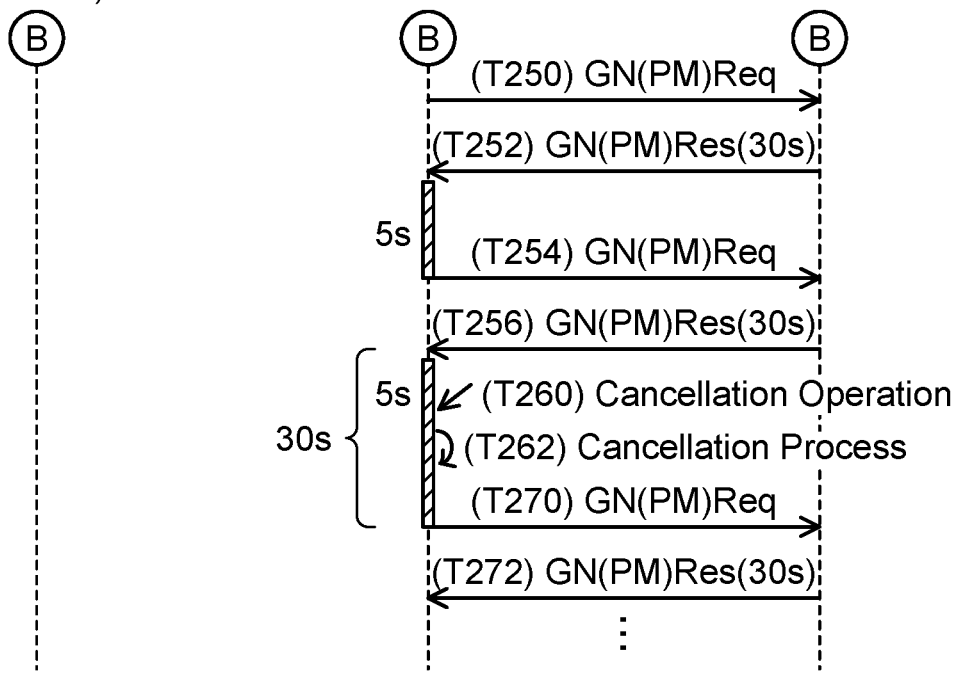

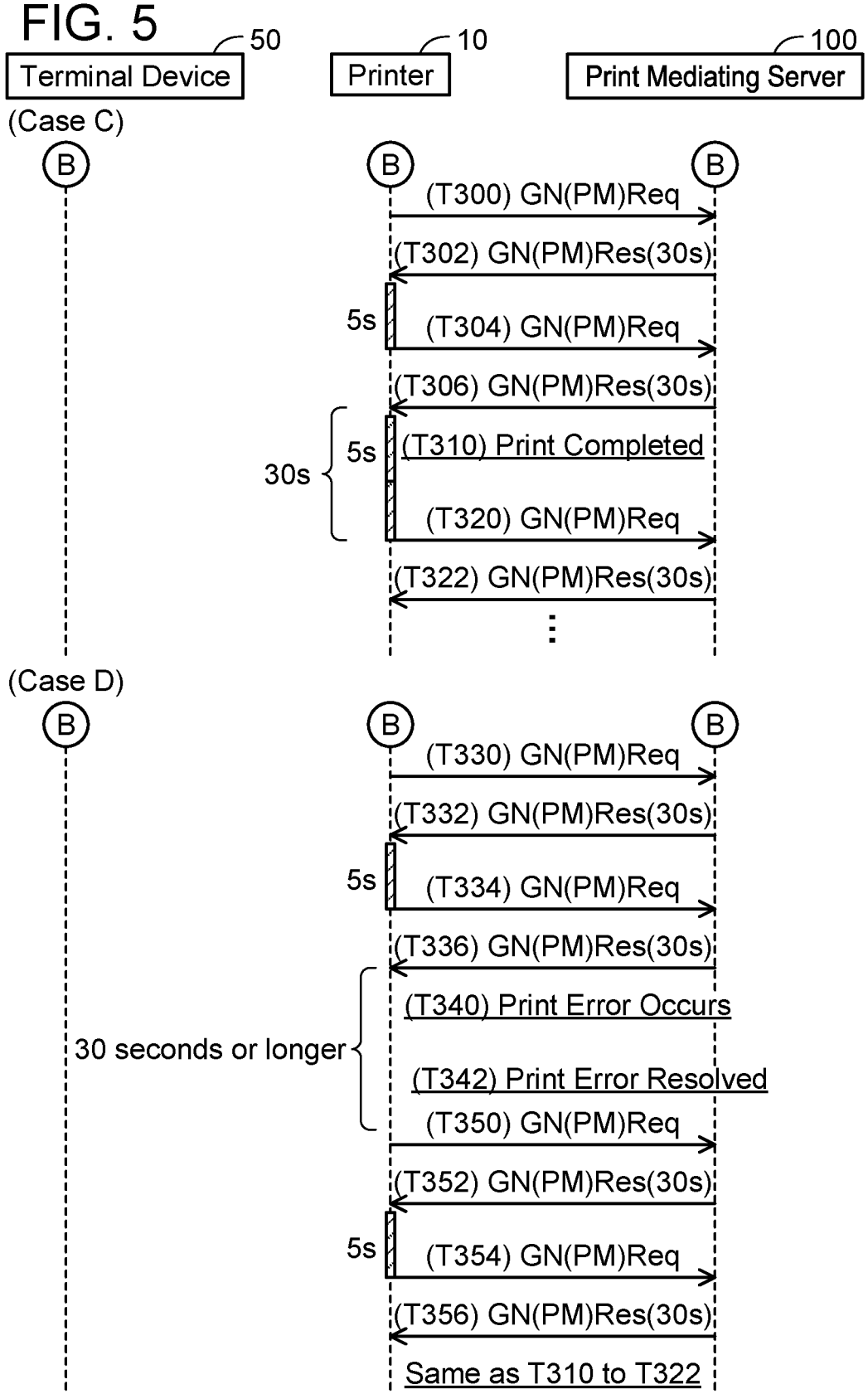

IMAGE FORMING DEVICE AND NON-TRANSITORY COMPUTER-READABLE RECORDING MEDIUM STORING COMPUTER-READABLE INSTRUCTIONS FOR IMAGE FORMING DEVICE

REFERENCE TO RELATED APPLICATIONS

This application claims priority from Japanese Patent Application No. 2021-208599 filed on Dec. 22, 2021. The entire content of the priority application is incorporated herein by reference.

BACKGROUND ART

A system including an image forming device, a cloud print server and a client terminal is known. The image forming device repeatedly sends an event confirmation request to the cloud print server. When the cloud print server receives a print job sending command from the client terminal, the cloud print server sends an event confirmation response indicating that there is a print job to the image forming device in response to the event confirmation request received from the image formation device. Consequently, the image forming device executes the print job.

DESCRIPTION

The above technique gives no consideration on the cloud print server receiving a command to stop execution of the print job from the client terminal. The present disclosure provides a technique which enables an image forming device to promptly stop image forming.

An image forming device disclosed herein may comprise: an image forming engine; and a controller. The controller may be configured to: repeatedly send an inquiry request to a server at a first interval, wherein in a case where the server receives a job execution instruction from a terminal device, the server sends a job execution response to the image forming device in response to the inquiry request received from the image forming device, the job execution response indicating that a job is to be executed; in a case where the job execution response is received from the server, control the image forming engine to start image forming; and in the case where the job execution response is received from the server, repeatedly send the inquiry request to the server at a second interval which is shorter than the first interval, wherein in a case where the server receives a job stop instruction from the terminal device, the server sends a job stop response to the image forming device in response to the inquiring request received from the image forming device, the job stop response indicating that the job is to be stopped. In a case where the job stop response is received, the image forming may be stopped.

According to the above configuration, the image forming device repeatedly sends the inquiry request to the server at the second interval shorter than the first interval when the image forming device receives the job execution response from the server. Accordingly, the image forming device can more promptly receive the job stop response from the server as compared to the configuration in which the inquiry request is repeatedly sent to the server at the first interval after image forming has been started. Consequently, the image forming device can promptly stop the image forming.

Computer-readable instructions for implementing the above image forming device, a computer-readable recording medium storing the computer-readable instructions and a method executed by the above image forming device are also novel and useful. A system comprising the above image forming device and other device(s) (e.g., server(s), terminal device(s)) is also novel and useful.

FIG. 4 illustrates sequence diagrams of Case A in which a cancellation instruction is sent to a print mediating server and Case B in which a cancellation operation is performed on a printer.

FIG. 5 illustrates sequence diagrams of Case C in which printing is completed and Case D in which an error occurs.

Figure 1:
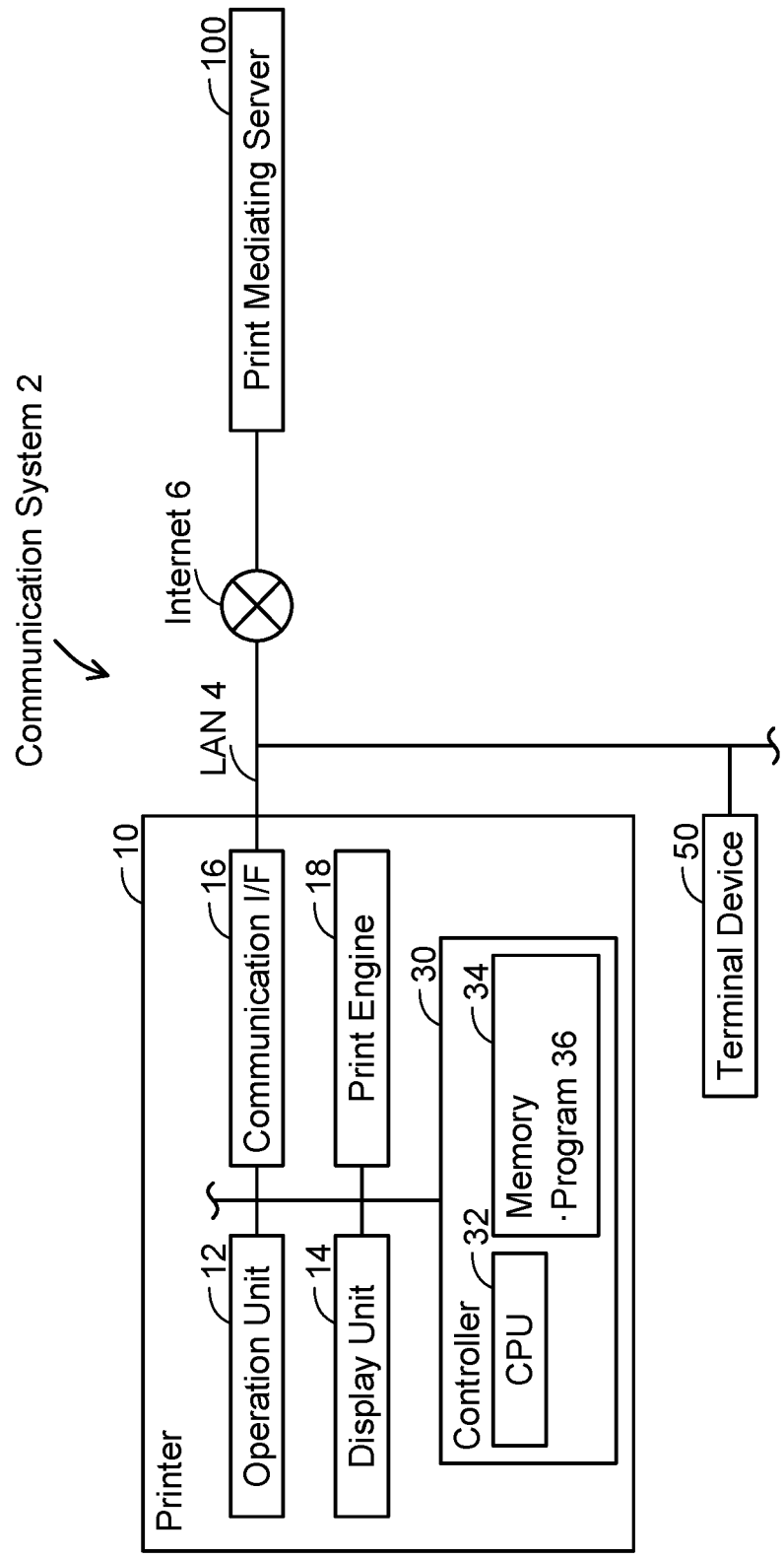
FIG. 1 illustrates a configuration of a communication system.

EMBODIMENT (Configuration of Communication System 2; FIG. 1) As illustrated in FIG. 1, a communication system 2 includes a printer 10, a terminal device 50 and a print mediating server 100. The printer 10 and the terminal device 50 belong to a Local Area Network (LAN) 4. The LAN 4 may be either a wired LAN or a wireless LAN. The print mediating server 100 is connected to the Internet 6. The printer 10 and the terminal device 50 are configured to communicate with the print mediating server 100 via the LAN 4 and the Internet 6. In a modification, the printer 10 and the terminal device 50 may not belong to the same LAN 4. For example, the printer 10 may belong to the LAN 4 (i.e., the printer 10 may be configured to communicate with the print mediating server 100 via the LAN 4) and the terminal device 50 may be configured to communicate with the print mediating server 100 via cellular communication such as 4G or 5G.

(Configuration of Printer 10)

The printer 10 is a peripheral device (e.g., peripheral device of the terminal 50) configured to execute a printing function. The printer 10 includes an operation unit 12, a display unit 14, a communication interface 16, a print engine 18 and a controller 30. Each of the units 12 to 30 is connected to a bus line (reference sign omitted).

The operation unit 12 includes a plurality of buttons. The display unit 14 is a display for displaying various types of information. The display unit 14 functions also as a so-called touch screen (i.e., an operation unit operated by a user). The communication interface 16 is connected to the LAN 4. The print engine 18 is a printing mechanism of an inkjet scheme, a laser scheme, or the like.

The controller 30 includes a CPU 32 and a memory 34. The CPU 32 is configured to perform various processes in accordance with a program 36 stored in the memory 34. The memory 34 is configured of a volatile memory, a nonvolatile memory, and the like.

(Configuration of Print Mediating Server 100)

The print mediating server 100 is a server configured to provide a so-called cloud print service. In the present embodiment, the print mediating server 100 is not a server installed by a vendor of the printer 10 but is a server installed by an operator providing the cloud print service. In a modification, the print mediating server 100 may be a server installed by the vendor of the printer 10. Google (registered trademark) Cloud Print service is an example of the cloud print service. The print mediating server 100 converts image data received from for example the terminal device 50 to generate print data and sends the print data to the printer 10. Hereafter, the print mediating server 100 is simply referred to as "server 100".

Figure 2:
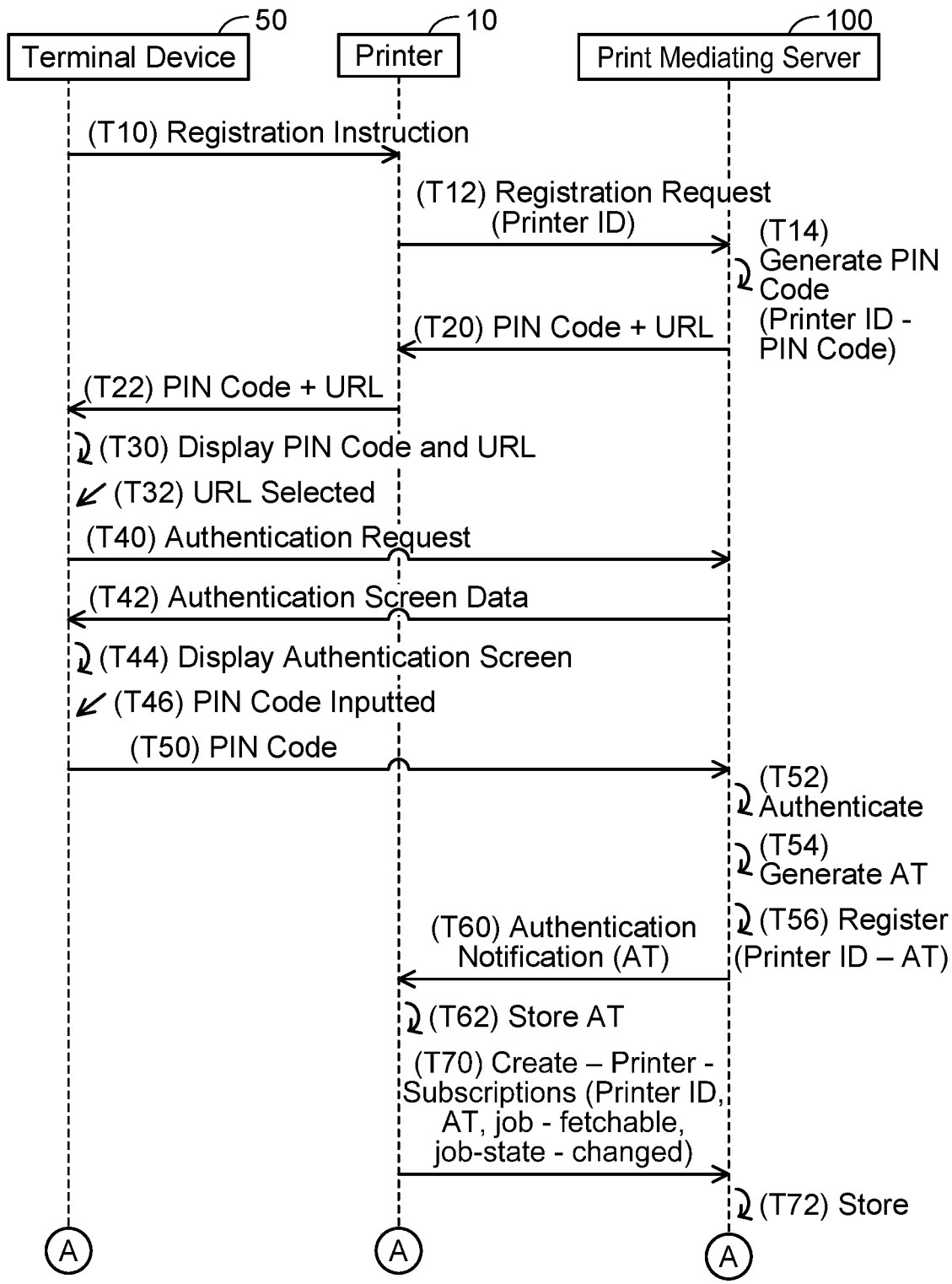
FIG. 2 illustrates a sequence diagram of a registration process.

(Registration Process: FIG. 2)

With reference to FIG. 2, a process for registering information related to the printer 10 in the server 100 in order for the printer 10 to receive a cloud print service from the server 100 will be described.

In the following descriptions, when a process executed by the CPU 32 of the printer 10 in accordance with the program 36 is explained, the printer 10 will be described as a subject executing the process instead of describing the CPU 32 as the subject executing the process. Further, all the communications below executed by the printer 10 is executed via the communication interface 16. Accordingly, hereafter, a recitation "via the communication interface 16" will be omitted when processes related to communication are explained.

In response to accepting an operation from a user (not illustrated), the terminal device 50 accesses for example a web server in the printer 10. In response to further accepting an operation for the printer 10 to receive the cloud print service from the user, the terminal device 50 sends a registration instruction to the printer 10 in T10.

When the printer 10 receives the registration instruction from the terminal device 50 in T10, the printer 10 sends a registration request including a printer ID which is information identifying the printer 10 to the server 100 in T12.

When the server 100 receives the registration request from the printer 10 in T12, the server 100 generates a PIN code in T14 and stores the printer ID included in the registration request and the generated PIN code in association with each other. Next, in T20, the server 100 sends the PIN code and a login Uniform Resource Locator (URL) to the printer 10. The login URL is information indicating a location of authentication screen data (to be described later) in the server 100.

When the printer 10 receives the PIN code and the URL from the sever 100 in T20, the printer 10 sends them to the terminal device 50 in T22.

When the terminal device 50 receives the PIN code and the URL from the printer 10 in T22, the terminal device 50 displays them in T30. Next, when the terminal device 50 accepts an operation to select the URL from the user in T32, the terminal device 50 sends an authentication request including the URL to the server 100 in T40.

When the server 100 receives the authentication request from the terminal device 50 in T40, the server 100 sends authentication screen data identified by the URL included in the authentication request to the terminal device 50 in T42. The authentication screen data is data representing an authentication screen for inputting a PIN code.

When the terminal device 50 receives the authentication screen data from the server 100 in T42, the terminal device 50 displays the authentication screen represented by the authentication screen data in T44. Next, the terminal device 50 accepts input of the PIN code displayed in T30 from the user in T46. In this case, the terminal device 50 sends the inputted PIN code to the server 100 in T50.

When the server 100 receives the PIN code from the terminal device 50 in T50, the server 100 executes authentication of the received PIN code in T52. Specifically, the server 100 determines whether the received PIN code is already stored or not. When the server 100 determines that the received PIN code is already stored, in other words, when the authentication succeeds, the server 100 generates an access token (hereafter referred to as AT (Access Token))

which is a unique character string in T54. Next, the server 100 identifies the printer ID associated with the received Pin code (see T14) and registers the identified printer ID and the generated AT in association with each other in T56. The server 100 then sends an authentication notification including the generated AT to the printer 10 in T60.

When the printer 10 receives the authentication notification from the server 100 in T60, the printer 10 causes the memory 34 to store the AT included in the authentication notification in T62. Next, the printer 10 sends a Create-Printer-Subscriptions (hereafter referred to as "CPS") to the server 100. The CPS is a command for registering a new event in the server 100 as Subscriptions. The CPS includes the printer ID, the AT stored in T62, a job-Fetchable and a job-state-changed. The job-Fetchable is a command for causing the server 100 to monitor receipt of a print instruction and notify the printer 10 that the print instruction is received. The job-state-changed is a command for causing the server 100 to monitor a status change of a print job and notify the printer 10 that the status of the print job is changed.

When the server 100 receives the CPS from the printer 10 in T70, the server 100 executes authentication of the AT included in the CPS. When the authentication succeeds, the server 100 stores the job-Fetchable and job-state-changed in association with the printer ID included in the CPS in T72. Consequently, in response to receiving a print instruction including the printer ID of the printer 10, the server 100 notifies the printer 10 that the print instruction has been received, and in response to receiving a job change instruction (i.e., a cancellation instruction) including the printer ID of the printer 10, the server 100 notifies the printer 10 that the job change instruction has been received. Consequently, the registration process ends.

Figure 3:
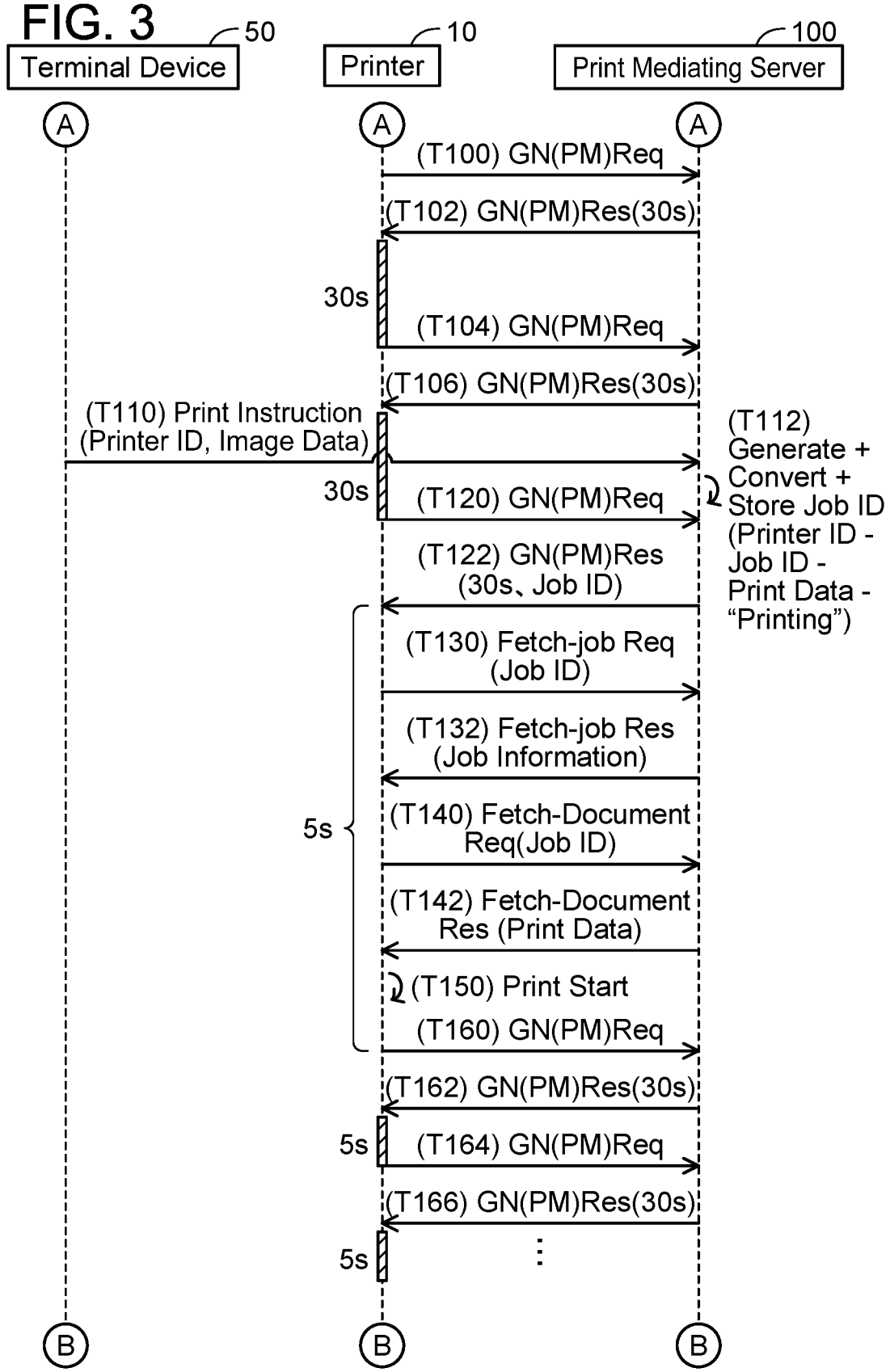
FIG. 3 illustrates a sequence diagram of a printing process.

(Print Process: FIG. 3)

Next, with reference to FIG. 3, the print process executed by the printer 10 will be explained. The process of FIG. 3 is continuation of the process of FIG. 2.

In the present embodiment, the printer 10 operates in a Polling Mode (hereafter referred to as "PM") when the process of FIG. 2 is completed. The PM is a mode of repeatedly sending a polling signal to the server 100 and receiving print data from the server 100. The printer 10 sends a Get-Notification (Polling Mode) Request (hereafter referred to as "GN(PM)Req") to the server 100 in T100. The GN(PM)Req corresponds to the polling signal described above. Although not illustrated, the GN(PM)Req includes the printer ID of the printer 10. The same applies to the GN(PM)Reqs described below.

When the server 100 receives the GN(PM)Req from the printer 10 in T100, the server 100 determines whether there is a print job to be executed by the printer 10 identified by the printer ID included in the GN(PM)Req. When the server 100 has already received the print instruction to be executed by the printer 10 from the terminal device 50, the server 100 determines that there is a print job to be executed by the printer 10, and sends a Get-Notification (Polling Mode) Response (hereafter referred to as "GN(PM)Res") including a Job ID to the printer 10. When the server 100 has not received the above print instruction from the terminal device 50, the server 100 determines that there is no print job to be executed by the printer 10 and sends the GN(PM)Res not including the Job ID to the printer 10. Both the GN(PM)Res including the Job ID and the GN(PM)Res not including the Job ID include interval information indicating 30 s (seconds), which is an interval before a next GN(PM)Req is sent. In a modification, the interval information may indicate an interval longer than 30 s or shorter than 30 s. Since the server 100 has not received the print instruction at the time of T100, the server 100 sends the GN(PM)Res not including the Job ID to the printer 10 in T102.

When the printer 10 receives the GN(PM)Res from the server 100 in T102, the printer 10 waits for 30 s as indicated by the interval information included in this GN(PM)Res. When 30 s passes, the printer 10 sends the GN(PM)Req to the server 100 in T104 and receives the GN(PM)Res not including the Job ID from the server 100 in T106. As described above, the printer 10 repeats sending of the GN(PM)Req to the server 100 in response to 30 s elapsing from when the GN(PM)Res not including the Job ID is received from the server 100. Consequently, the printer 10 can repeatedly send the GN(PM)Req to the server 100 at an interval in accordance with the instruction from the server 100.

Although not illustrated, the terminal device 50 accepts a print operation to cause the printer 10 to execute printing from the user. The print operation includes an operation to designate the printer ID of the printer 10 and an operation to designate image data representing an image to be printed. When the terminal device 50 accepts the print operation from the user, the terminal device 50 sends the print instruction including the designated printer ID and the designated image data to the server 100 in T110.

When the server 100 receives the print instruction from the terminal device 50 in T110, the server 100 generates a Job ID which is an ID identifying the print job in T112. Further, the server 100 converts the image data included in the print instruction and generates print data having a data format which the printer 10 can interpret. Then, the server 100 stores the printer ID included in the print instruction, the generated Job ID, the generated print data and a status "printing" in association with each other.

Thereafter, when the server 100 receives the GN(PM)Req from the printer 10 in T120, the server 100 determines that there is a print job to be executed by the printer 10 since the server 100 already has the Job ID and the like stored in association with the printer ID included in the GN(PM)Req (see T112). In this case, the server 100 sends the GN(PM)Res including the Job ID to the printer 10 in T122.

When the printer 10 receives the GN(PM)Res including the Job ID from the server 100 in T122, the printer 10 sends a Fetch-job Request including this Job ID to the sever 100 in T130 and receives a Fetch-job Response from the server 100 in T132. The Fetch-job Response includes job information indicating print conditions (e.g., paper size, number of colors, number of sheets).

Next, the printer 10 sends a Fetch-Document Request to the server 100 in T140 and receives a Fetch Document Response from the server 100 in T142. The Fetch-Document Response includes the print data generated in T112. In this case, the printer 10 (i.e., the CPU 32) controls the print engine 18 (specifically, supplies the job information and the print data to the print engine 18) and starts printing in accordance with the job information and the print data in T150.

The GN(PM)Res in T122 includes the interval information indicating 30 s. When 5 s shorter than 30 s passes, however, the printer 10 sends the GN(PM)Req to the server 100 in T160 and receives the GN(PM)Res from the server 100 in T162. This GN(PM)Res does not include the Job ID but includes the interval information indicating 30 s. However, when 5 s shorter than 30 s passes, the printer 10 sends the GN(PM)Req to the server 100 in T164 and receives the GN(PM)Res from the server 100 in T166. As described above, when the printer 10 receives the GN(PM)Res including the Job ID from the server 100 (T122), the printer 10 repeats sending of the GN(PM)Req to the server 100 at the interval of 5 s shorter than 30 s despite the interval information included in the GN(PM)Res indicating 30 s.

(Various Cases A to D: FIG. 4 and FIG. 5)

Next, various Cases A to D implemented after printing is started in FIG. 3 will be explained with reference to FIG. 4 and FIG. 5. Case A in FIG. 4 is a case in which a print cancellation instruction is sent from the terminal device 50. Case B is a case in which a print cancellation operation is performed on the printer 10. Case C in FIG. 5 is a case in which printing is normally completed. Case D is a case in which a print error occurs.

(Case A: FIG. 4)

Case A in FIG. 4 will firstly be explained. In T200, the printer 10 sends the GN(PM)Req to the server 100 and receives the GN(PM)Res from the server 100 in T202.

Although not illustrated, the terminal device 50 accepts a cancellation operation for cancelling printing from the user. In this case, the terminal device 50 sends a cancellation instruction including the printer ID of the printer 10 to the server 100 in T210.

When the server 100 receives the cancellation instruction from the terminal device 50 in T210, the server 100 identifies the Job ID associated with the printer ID included in the cancellation instruction (see T112 of FIG. 3) and deletes the print data associated with the identified Job ID in T212. Then, the server 100 stores the printer ID, the identified Job ID, and the status "cancellation" in association with each other.

Thereafter, when the server 100 receives the GN(PM)Req from the printer 10 in T220, the server 100 identifies the Job ID and the status "cancellation" associated with the printer ID included in this GN(PM)Req (see T212), and sends the GN(PM)Res including the cancellation information to the printer 10 in T222.

When the printer 10 receives the GN(PM)res including the cancellation information from the server 100 in T222, the printer 10 executes a cancellation process in T230. The cancellation process includes supplying an instruction indicating that printing is to be cancelled to the print engine 18 and deleting the received print data. Consequently, printing is stopped in the print engine 18.

When the printer 10 receives the GN(PM)Res of T222, the printer 10 changes the interval for repeatedly sending the GN(PM)Req. Specifically, after the printer 10 waits for 30 s as indicated by the interval information included in the GN(PM)Res of T222, the printer 10 sends the GN(PM)Req to the server 100 in T240 and receives the GN(PM)Res not including the job ID from the server 100 in T242. As described above, the printer 10 can repeatedly send the GN(PM)Req to the server 100 at the interval in accordance with the instruction from the server 100 after printing is cancelled.

According to above Case A, when the printer 10 receives the GN(PM)Res including the Job ID from the server 100 (T122 of FIG. 3), the printer 10 repeatedly sends the GN(PM)Req to the server 100 at the interval of 5 s shorter than 30 s as indicated by the interval information included in the GN(PM)Res (T160, T164 of FIG. 3, T200, T220 of FIG. 4). Accordingly, as compared to a configuration in which the GN(PM)Req is repeatedly sent to the server 100 at the interval of 30 s after printing is started, the printer 10 can more promptly receive the GN(PM)Res including the cancellation information from the server 100 (T222). Therefore, the printer 10 can promptly cancel the printing.

(Case B: FIG. 4)

Next, Case B will be explained. In T250 and T254, the printer 10 sends the GN(PM)Req to the server 100 and receives the GN(PM)Res from the server 100 in T252 and T256.

Before 5 s passes from when the GN(PM)Res of T256 is received, the printer 10 accepts a cancellation operation for cancelling printing from the user in T260. This cancellation operation may be an operation on a button constituting the operation unit 12 or may be an operation on a button displayed on the display unit 14 which functions as a so-called touch screen. In this case, the printer 10 executes a cancellation process in T262. This cancellation process is the same as the cancellation process of T230 of Case A.

Although not illustrated, when the printer 10 accepts the cancellation operation in T260, the printer 10 sends information indicating that the cancellation operation has been accepted to the server 100. Consequently, in the server 100, the Job ID, the print data and the status "printing" associated with the printer ID are deleted.

When the printer 10 accepts the cancellation operation of T262, the printer 10 changes the interval for repeatedly sending the GN(PM)Req. Specifically, after the printer 10 waits for 30 s as indicated by the interval information included in the GN(PM)Res of T256, the printer 10 sends the GN(PM)Req to the server 100 in T270 and receives the GN(PM)Res not including the job ID from the server 100 in T272. As described above, after the printing is cancelled, the printer 10 can repeatedly send the GN(PM)Req to the server 100 at the interval in accordance with the instruction from the server 100.

(Case C: FIG. 5)

Next, Case C will be explained. In T300 and T304, the printer 10 sends the GN(PM)Req to the server 100 and receives the GN(PM)Res from the server 100 in T302 and T306.

The printer 10 completes printing in T310 before 5 s passes from when the GN(PM)Res of T306 was received without receiving the GN(PM)Res including the cancellation information from the server 100 (see T222 of FIG. 4) nor accepting the cancellation operation from the user (see T260 of FIG. 4).

Although not illustrated, when the printing is completed in T310, the printer 10 sends information indicating that the printing has been completed to the server 100. Consequently, the Job ID, the print data and the status "printing" associated with the printer ID are deleted in the server 100.

When the printing is completed in T310, the printer 10 changes the interval for repeatedly sending the GN(PM)Req. Specifically, after the printer 10 waits for 30 s as indicated by the interval information included in the GN(PM)Res of T306, the printer 10 sends the GN(PM)Req to the server 100 in T320 and receives the GN(PM)Res not including the job ID from the server 100 in T322. As described above, after the printing is completed, the printer 10 can repeatedly send the GN(PM)Req to the server 100 at the interval in accordance with the instruction from the server 100.

(Case D: FIG. 5)

Next, Case D will be explained. In T330 and T334, the printer 10 sends the GN(PM)Req to the server 100 and receives the GN(PM)Res from the server 100 in T332 and T336.

Before 5 s passes from when the GN(PM)Res of T336 was received, a print error occurs to the print engine 18 in T340. The print error may for example be paper jam, out of paper, out of color material for printing, or the like. In this case, the printer 10 stops the sending of the GN(PM)Req. In other words, even when 5 s passes from when the GN(PM) Res of T336 was received, the printer 10 does not send the GN(PM)Req to the server 100. Further, even when 30 s also passes from when the GN(PM)Res of T336 was received, the printer 10 does not send the GN(PM)Req to the server 100. Until the print error is resolved, the printer 10 stops the sending of the GN(PM)Req. Consequently, a process load on the printer 10 and a communication load between the printer 10 and the server 100 can be reduced.

Thereafter, in response to an action to resolve the print error being taken by the user (e.g., filling the print paper), the print error is resolved in T342. In this case, the printer 10 sends the GN(PM)Req to the server 100 in T350 and T354 and receives the GN(PM)Res from the server 100 in T352 and T356. In other words, the printer 10 restarts to repeatedly send the GN(PM)Req to the server 100 at the interval of 5 s. Therefore, if the server 100 receives a cancellation instruction from the terminal device 50, the printer 10 can promptly receive the GN(PM)Res including the cancellation information from the server 100. In the present Case D, the same processes as T310 to T322 of Case C are performed after T356.

(Corresponding Relationships)

The printer 10 and the print engine 18 are an example of "image forming device" and "image forming engine", respectively. The GN(PM)Req is an example of "inquiry request". The GN(PM)Res including the Job ID (see T122 of FIG. 3) and the GN(PM)Res not including the Job ID (T102 of FIG. 3) are an example of "job execution response" and "job non-execution response", respectively. The print instruction of T110 of FIG. 3 is an example of "job execution instruction". The cancellation instruction of T210 of FIG. 4 is an example of "job stop instruction". The GN(PM)Res including the cancellation information (T222 of FIG. 4) is an example of "job stop response". The cancellation operation of T260 of FIG. 4 is an example of "stop operation". 30 s and 5 s are an example of "first interval" and "second interval", respectively.

T100, T104 and T120 of FIGS. 3, T240 and T270 of FIGS. 4 and T320 of FIG. 5 are examples of "repeatedly send an inquiry request to a server at a first interval". T150 of FIG. 3 is an example of " . . . control the image forming engine to start image forming". T160, T164 of FIG. 3 and the like are examples of "repeatedly send the inquiry request to the server at a second interval which is shorter than the first interval".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The above embodiment contemplates that the server 100 receives the cancellation instruction from the terminal device 50 (see Case A in FIG. 4). Instead of this, the server 100 may receive a pause instruction from the terminal device 50 in T210 of FIG. 4. In this case, the server 100 sends the GN(PM)Res including pause information to the printer 10 in T222. In T230, the printer 10 stops printing. However, the printer 10 does not delete the print data. Consequently, the printer 10 can restart the printing when the printer 10 receives the GN(PM)Res including information indicating that the printing is to be restarted from the server 100. In the present modification, the pause instruction and the GN(PM)Res including the pause information are an example of "job stop instruction" and "job stop response", respectively. In another modification, the server 100 may receive an interrupt instruction from the terminal 50 in T210 of FIG. 4. In this case, in T222, the server 100 sends the GN(PM)Res including the interrupt information to the printer 10. The printer 10 stops printing in T230. However, the printer 10 does not delete the print data. The printer 10 receives new print data which is to interrupt from the server 100 and execute printing according to the new print data. Thereafter, the printer 10 restarts the stopped printing. In the present modification, the interrupt instruction and the GN(PM)Res including the interrupt information are an example of "job stop instruction" and "job stop response".

(Modification 2) A scanner may be used instead of the printer 10. In this case, a scan mediating server is used instead of the print mediating server 100. In the present modification, the processes are executed as follows. In T110 of FIG. 3, a scan instruction is communicated instead of the print instruction. Neither T140 nor T142 is executed. In T150, scanning of a document is started. In T230 or T262 of FIG. 4, scanning is cancelled. When scanning is completed in T310 of FIG. 5, scan data is sent to the terminal device 50 from the scanner via the scan mediating server. In the present modification, the scanner and a scanner engine are an example of "image forming device" and "image forming engine", respectively.

(Modification 3) When the printer 10 executes the cancellation process in T230 or T262 of FIG. 4, the printer 10 may start repeatedly sending the GN(PM)Req to the server 100 at an interval different from 30 s (e.g., 20 s, 40 s). Further, when the printer 10 completes the printing in T310 of FIG. 5, the printer 10 may start repeatedly sending the GN(PM)Req to the server 100 at an interval different from 30 s. In general terms, when the job stop response is received from the server, when image processing is completed, or when the stop operation is executed to the operation unit, "repeatedly send an inquiry request to a server at a first interval" may not include repeatedly sending the inquiry request at the first interval.

(Modification 4) The GN(PM)Res may not include the interval information. Before receiving the GN(PM)Res including the Job ID from the server 100, the printer 10 may repeatedly send the GN(PM)Req at an interval (e.g., 20 s) predetermined by the program 36. Then, after receiving the GN(PM)Res including the Job ID from the server 100, the printer 10 may repeatedly send the GN(PM)Req at an interval (e.g., 10 s) shorter than the above interval. In general terms, each of "job execution response" and "job non-execution response" may not include the interval information.

(Modification 5) When a print error occurs in T340 of FIG. 5, the printer 10 may not stop sending the GN(PM)Req. In general terms, when an error occurs at the image forming engine, repetitive sending of the inquiry request to the server may not be stopped.

(Modification 6) In the above embodiment, the first GN(PM)Req after the printing has been completed in T310 of FIG. 5 is sent when 30 s passes from the time when the previous GN(PM)Req was sent. Instead of this, the first GN(PM)Req after the printing has been completed may be sent when 5 s passes from the time when the previous GN(PM)Req was sent, and the second and subsequent GN(PM)Reqs may be sent at the interval of 30 s. Similarly, the first GN(PM)Req after the cancellation process is executed in T230 or T262 of FIG. 4 may be sent after 5 s passes from when the previous GN(PM)Req is sent and the second and subsequent GN(PM)Reqs may be sent at the interval of 30 s.

(Modification 7) In the above embodiments, the processes of FIGS. 2 to 5 are implemented by the CPU 32 of the printer 10 executing the program 36. Instead of this, one or more of these processes may be implemented by hardware such as a logic circuit.

What is claimed is:

1. An image forming device comprising:
an image forming engine; and
a controller,
wherein the controller is configured to:
send an inquiry request to a server and receive a response to the inquiry request from the server,
wherein in a case where the response from the server is a job execution response, the job execution response indicating that a job is to be executed, send a next inquiry request to the server after a first time interval elapses after the job execution response is received by the image forming device;
wherein in a case where the job execution response is received from the server, control the image forming engine to start image forming; and
wherein in a case where the response is-received from the server is not the job execution response, send a next inquiry request to the server after a second time interval elapses after the response that is not the job execution response is received by the image forming device, the second time interval being longer than the first time interval,
wherein in a case where the response from the server is a job stop response to the image forming device, the job stop response indicating that the job is to be stopped, control the image forming engine to stop image forming.

2. The image forming device as in claim 1, wherein in a case where the job stop response is received from the server, the controller is configured to send a next inquiry request to the server after the second time interval elapses after the job stop response is received from the server.

3. The image forming device as in claim 1, wherein in a case where the server does not receive a job execution instruction from a terminal device, the server sends a job non-execution response to the image forming device in response to the inquiry request received from the image forming device, the job non-execution response indicating that the job is not to be executed and including interval information indicating the second time interval, and
the controller is configured to send the inquiry request to the server when the second time interval indicated by the interval information included in the job non-execution response elapses from when the job non-execution response is received from the server.

4. The image forming device as in claim 1, wherein the job execution response includes interval information indicating the first time interval, and
in the case where the job execution response is received from the server, regardless of the interval information included in the job execution response indicating the second time interval, the controller is configured to send the inquiry request to the server when the first time interval which is shorter than the second time interval elapses from when the job execution response is received from the server.

5. The image forming device as in claim 1, wherein
in a case where the image forming is completed without the job stop response being received from the server, the controller is configured to send a next inquiry request to the server after the second time interval elapses after the response that is not the job execution response or the job stop response is received by the image forming device.

6. The image forming device as in claim 1, further comprising:
an operation unit configured to be operated by a user,
wherein in a case where a stop operation for stopping the image forming is performed on the operation unit, the image forming is stopped without the job stop response being received from the server, and
in a case where the stop operation is performed on the operation unit, the controller is configured to send a next inquiry request to the server after the second time interval elapses after the response that is not the job execution response or the job stop response is received by the image forming device.

7. The image forming device as in claim 1, wherein
in a case where an error occurs at the image forming engine after the image forming has been started, sending of the inquiry request is stopped.

8. The image forming device as in claim 7, wherein
in a case where the error is resolved, the controller is configured to send a next inquiry request to the server after at the first time interval elapses after the response that is not the job execution response or the job stop response is received by the image forming device.

9. The image forming device as in claim 1, wherein
the image forming engine is a print engine, and
the image forming is printing an image on a print medium.

10. The image forming device as in claim 1, wherein
in a case where the server receives a job stop instruction from a terminal device, the server sends the job stop response to the image forming device in response to the inquiring request received from the image forming device, the job stop instruction is an instruction for canceling the job, and the job stop response indicates that the job is to be canceled.

11. A non-transitory computer-readable recording medium storing computer-readable instructions for an image forming device,
the computer-readable instructions, when executed by a processor of the image forming device, cause the image forming device to:
send an inquiry request to a server and receive a response to the inquiry request from the server,
wherein in a case where the response from the server is a job execution response, the job execution response indicating that a job is to be executed, send a next inquiry request to the server after a first time interval elapses after the job execution response is received by the image forming device;
wherein in a case where the job execution response is received from the server, control the image forming engine to start image forming; and
wherein in a case where the response received from the server is not the job execution response, send a next inquiry request to the server after a second time interval elapses after the response that is not the job execution response is received by the image forming device, the second time interval being longer than the first time interval,
wherein in a case where the response from the server is a job stop response to the image forming device, the job stop response indicating that the job is to be stopped, control the image forming engine to stop image forming.

* * * * *